US009357111B2

(12) United States Patent
White et al.

(10) Patent No.: US 9,357,111 B2
(45) Date of Patent: May 31, 2016

(54) CASING

(75) Inventors: Daniel John White, Salisbury (GB); Clive Charles Woolley, Salisbury (GB); Jim Maurice Abbey, Salisbury (GB); David Simpson, Salisbury (GB); Christopher Mark Driscoll, Salisbury (GB)

(73) Assignee: QINETIQ LIMITED, Hampshire (GB)

( * ) Notice: Subject to any disclaimer, the term of this patent is extended or adjusted under 35 U.S.C. 154(b) by 140 days.

(21) Appl. No.: 14/129,465

(22) PCT Filed: Jun. 30, 2012

(86) PCT No.: PCT/GB2012/000563
§ 371 (c)(1),
(2), (4) Date: Dec. 26, 2013

(87) PCT Pub. No.: WO2013/004991
PCT Pub. Date: Jan. 10, 2013

(65) Prior Publication Data
US 2014/0139730 A1 May 22, 2014

(30) Foreign Application Priority Data

Jul. 1, 2011 (GB) .................................. 1111270.3

(51) Int. Cl.
| | | |
|---|---|---|
| *B64D 47/08* | (2006.01) | |
| *G03B 17/02* | (2006.01) | |
| *H04N 5/225* | (2006.01) | |
| *G03B 15/00* | (2006.01) | |

(52) U.S. Cl.
CPC .............. *H04N 5/2252* (2013.01); *B64D 47/08* (2013.01); *G03B 15/006* (2013.01); *G03B 17/02* (2013.01)

(58) Field of Classification Search
CPC ...... B64D 47/08; H04N 5/2252; G03B 15/006
See application file for complete search history.

(56) References Cited

U.S. PATENT DOCUMENTS

| | | | | |
|---|---|---|---|---|
| 3,917,199 | A | * | 11/1975 | Dewitt ............................ 396/13 |
| 4,472,632 | A | * | 9/1984 | Durenec ................... F41G 1/36 |
| | | | | 250/333 |
| 4,886,222 | A | | 12/1989 | Burke |
| 5,365,291 | A | * | 11/1994 | Maeda ............................ 396/12 |

(Continued)

FOREIGN PATENT DOCUMENTS

| | | |
|---|---|---|
| CN | 201376671 Y | 1/2010 |
| DE | 2 311 433 | 9/1974 |

(Continued)

OTHER PUBLICATIONS

International Search Report issued in International Patent Application No. PCT/GB2012/000563 dated Oct. 30, 2013.

(Continued)

*Primary Examiner* — Tien Dinh
*Assistant Examiner* — Richard R Green
(74) *Attorney, Agent, or Firm* — Oliff PLC

(57) ABSTRACT

Casings and housings for use in high speed airflow (for example for mounting on a high speed vehicle) are described. In one embodiment, a housing for imaging equipment is described. The housing has a tapering form with symmetrical angular truncations such that it tapers in the form of a wedge with two substantially planar regions. At least one substantially planar region includes an aperture formed of optically transparent material.

18 Claims, 13 Drawing Sheets

(56) References Cited

U.S. PATENT DOCUMENTS

| | | | |
|---|---|---|---|
| 5,531,403 | A | 7/1996 | Tyler |
| 5,806,789 | A * | 9/1998 | Boulware et al. ............. 244/1 R |
| 6,533,218 | B1 | 3/2003 | Jahn |
| 6,685,143 | B1 * | 2/2004 | Prince ....................... B64C 5/12 244/203 |
| 6,745,981 | B1 | 6/2004 | Rainer et al. |
| 2002/0186484 | A1 | 12/2002 | Casteleiro et al. |
| 2003/0071170 | A1 | 4/2003 | Hilbert |
| 2004/0257441 | A1 * | 12/2004 | Pevear et al. .................. 348/144 |
| 2007/0152099 | A1 | 7/2007 | Moreau |
| 2007/0205327 | A1 | 9/2007 | Gioffre et al. |
| 2012/0033960 | A1 | 2/2012 | Hashimoto |

FOREIGN PATENT DOCUMENTS

| | | |
|---|---|---|
| FR | 2 863 584 A1 | 6/2005 |
| JP | A-2006-221366 | 8/2006 |
| WO | WO 97/13169 | 4/1997 |
| WO | WO 01/77627 A2 | 10/2001 |
| WO | WO 03/097453 A2 | 11/2003 |
| WO | WO 2010/125994 A1 | 11/2010 |
| WO | WO 2011/066410 A1 | 6/2011 |

OTHER PUBLICATIONS

Written Opinion of the International Searching Authority issued in International Patent Application No. PCT/GB2012/000563 dated Oct. 30, 2013.

British Search Report issued in British Patent Application No. 1111270.3 dated Oct. 19, 2011.

Corrected British Search Report issued in British Patent Application No. 1111270.3 dated Apr. 21, 2012.

British Search Report issued in British Patent Application No. 1111270.3 dated Apr. 28, 2012.

* cited by examiner

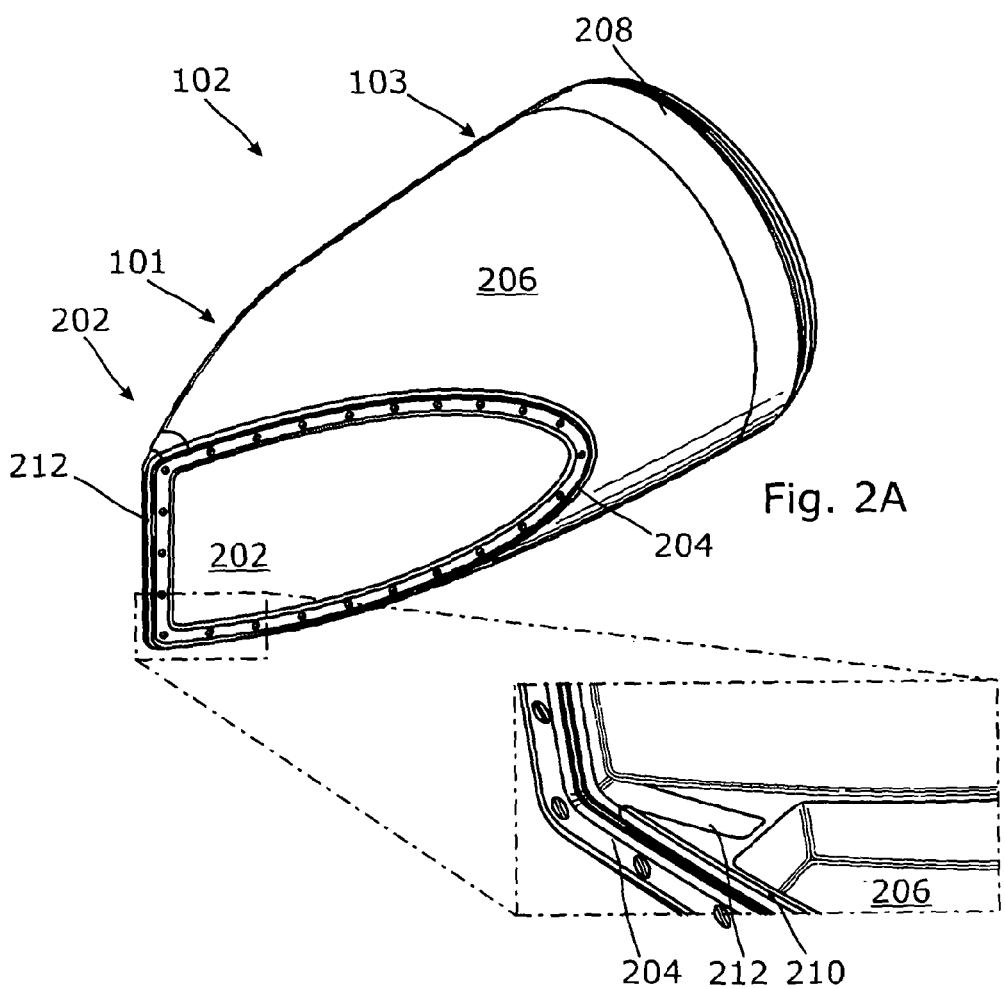
Fig. 2A
Fig. 2B
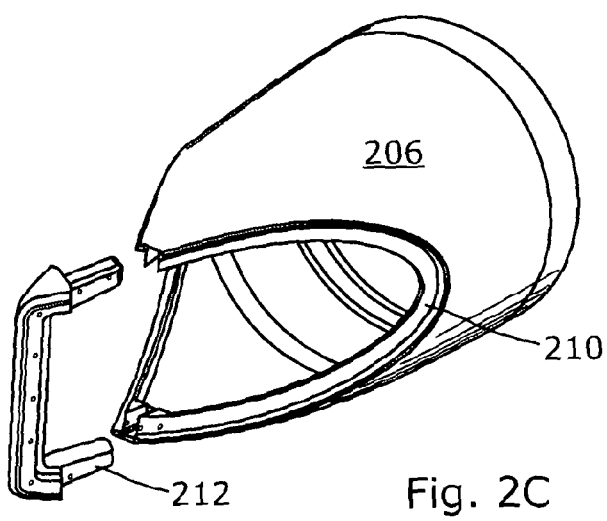
Fig. 2C

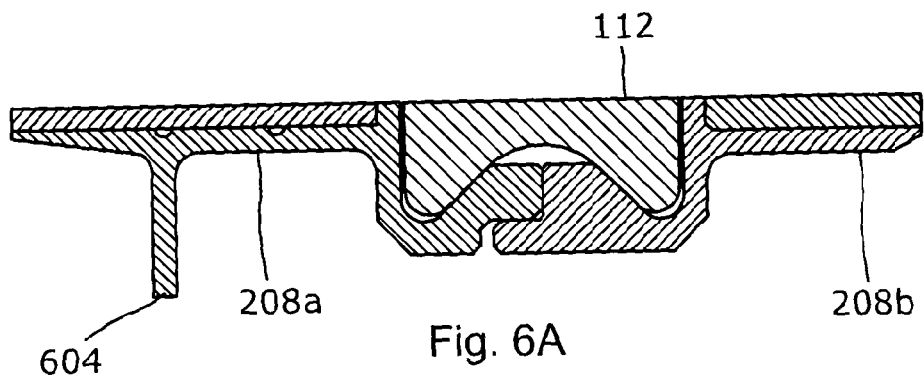
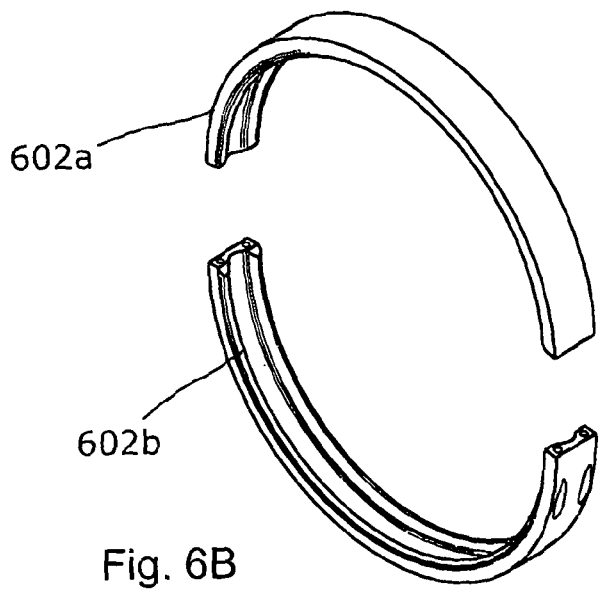
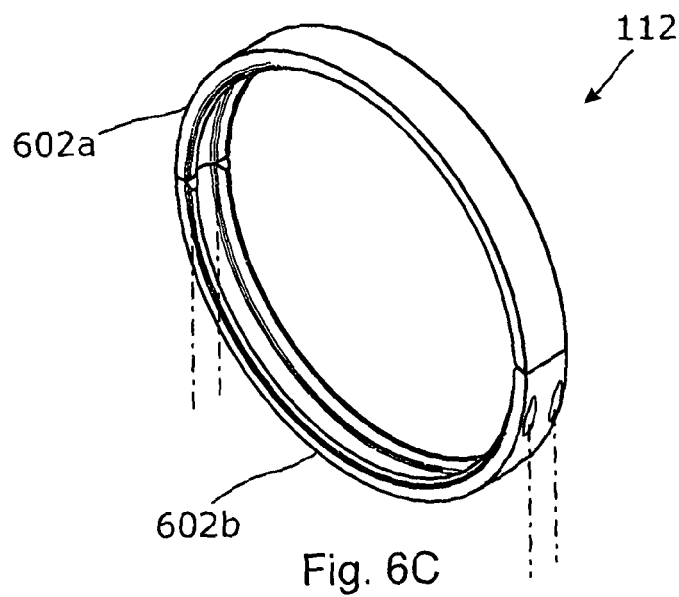

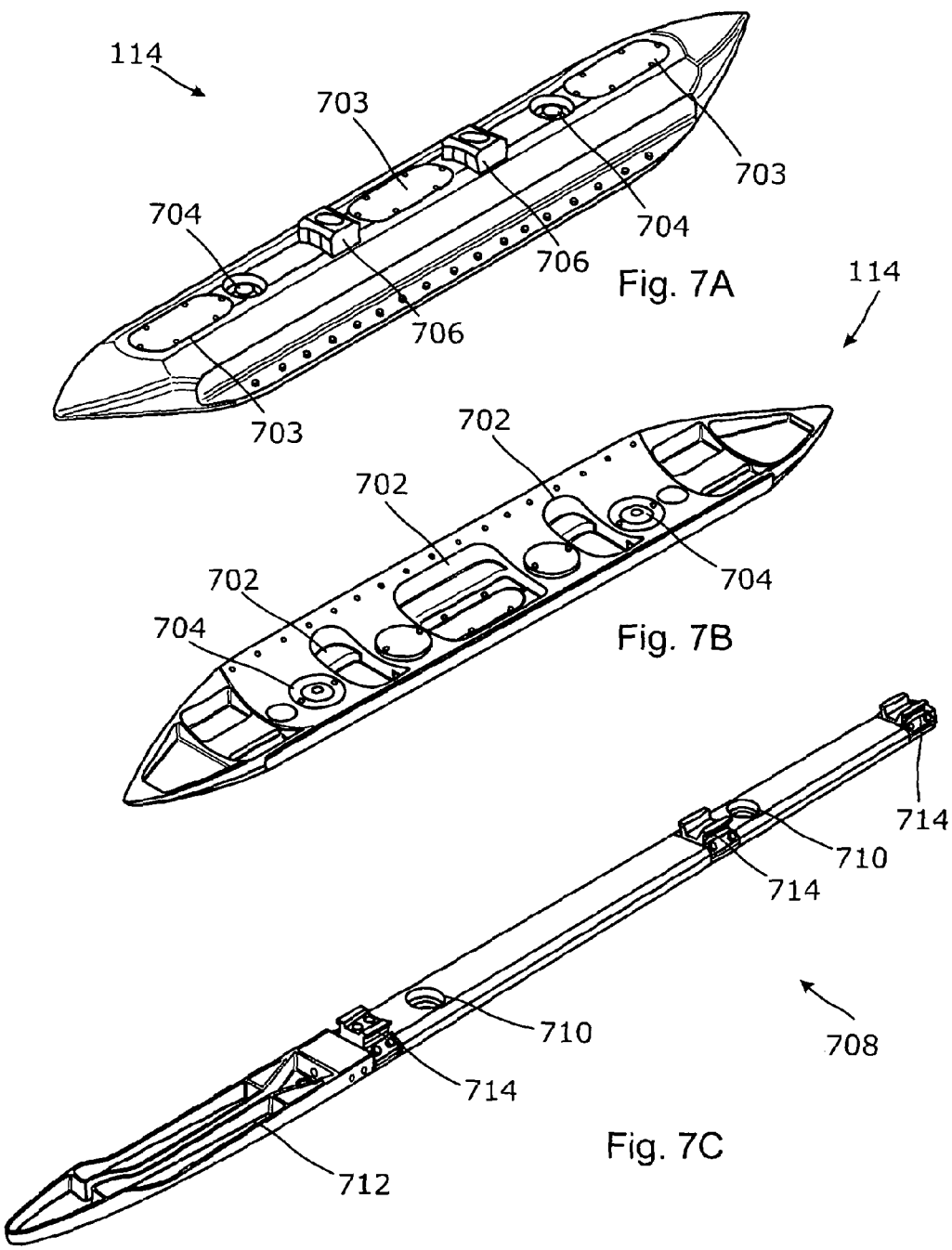

CASING

The present invention relates to apparatus and methods for casings, in particular but not exclusively for casings for sensing apparatus intended to operate in high stress environments. Associated apparatus and methods of operation are also disclosed.

There are many occasions where versatile and/or robust sensing capability is required. One particular example is where imaging (or other) apparatus may be required to operate in harsh conditions, for example be subjected to high accelerations, pressures and/or high speed airflows within its operating environment.

It may be the case that sensing equipment is required on high speed vehicles. For example, airborne cameras have been used for many years to record the carriage, release trajectory, near field effects and characteristics of objects (e.g. packages, missiles etc, commonly known in the field as 'stores') released from military aircraft. This imagery is used for many purposes, for example to verify theoretical modelling predictions of stores release and the correct operation of arming and safety lanyards, umbilicals and ejection equipment, flare release, etc. The imagery is also used to observe at close hand any potentially damaging conflicts of the released stores with the aircraft and other stores suspended from it, which in the past has resulted in disastrous consequences.

Such aircraft can be very fast moving (for example supersonic jets) or subject to irregular movements (such as high levels of vibration in helicopters), making for challenging imaging environments. In order to gather such images, the skilled person usually makes a choice between mounting a camera on an aircraft carrying the stores for release, or carrying imaging equipment in a second 'chase' aircraft following closely.

Both methods have associated disadvantages: the use of a chase aircraft is costly and has also lead to mishaps when the stores have collided with the chase aircraft. Generally, such cameras are carried in so-called 'pods', which have typically been based on an existing aircraft pod manufactured for another purpose with modifications to enable the fitting of cameras, viewing windows, adjustment structure and the necessary heaters etc. These pods are generally aircraft specific i.e. can not be used on other aircraft, and contain many compromises inherent from their original design function.

Most such camera pods relied on host aircraft power supplies and camera triggering function by the aircrew, leading to increased pilot workload, indeed this has lead in some cases to wasted 'sorties' due to triggering errors caused by high pilot workload during the critical stores release phase. Further, mounting a camera on an aircraft can affect its flight characteristics.

Although high speed 'wet film' devices, which are bulky and require a large pod 'envelope' to contain them, with high maintenance requirements and heating facilities, have generally been used, the film for such cameras is now in short supply as most imaging equipment is now digital. As these cameras run at up to 500 ffps, there is a considerable quantity of film stock required for a typical sortie especially as the cameras require a 'run up' period prior to the trigger event, and are prone to film breakage. Post processing of the film is costly, and requires the removal of the film cassettes from the pod and specialist facilities for film development along with the hazardous chemicals used during development.

Although the description above has centred on the challenges faced in aircraft mounted imaging equipment, it will be readily apparent that technology which solves these problems is also of use in other fields, and could be of use in land or sea related imaging or indeed in other forms of sensing (e.g. Radar, LIDAR, or other sensors devices). Sensors are also used in a fixed positions which are or may be affected by harsh conditions such as high vibration, temperature gradients, pressure or supersonic airflow or turbulent winds or other fluid flow.

The invention seeks to provide an improved method and apparatus for carrying sensor equipment in high stress environments. In some aspects, the invention seeks to provide an improved method and apparatus for carrying sensor equipment (which may in particular be imaging equipment) on aircraft.

According to a first aspect of the present invention there is provided a modular casing for sensing apparatus arranged to be mounted on a high speed vehicle, the casing comprising at least one nose section, at least one body section and at least one tail section, wherein said sections are detachably connected to one another so as to permit disassembly of the casing.

Such a casing may provide a 'pod' as described above. Providing a modular construction which permits disassembly is advantageous as it allows access to sensor equipment contained within the casing. Further, a modular casing is adaptable for purpose: it allows sections to be exchanged or replaced, and allows additional sections to be added. Prior art camera casings usually comprise a single body structure, as the manufacturers consider such casings as relatively cheap, stand alone, and often single use, items. However, a modular casing is advantageous in that it may be modified and deployed on many vehicle (e.g. aircraft) types despite not being originally designed with that role in mind.

In preferred embodiments, the casing further comprises mounting means arranged to allow the casing to be mounted onto a high speed vehicle. In particular, the mounting means may comprise a mounting rail or the like which conforms to existing attachment standards. This may mean that the vehicle itself need not be modified to accept the casing.

The casing may comprise a load carrying structure which is arranged to provide hardpoint attachments to a host vehicle. As will be appreciated by the skilled person, the term 'hardpoint' is a term of art which refers to part of an airframe (or, by extension of the term's original use, other non-air vehicles) designed to carry an external load, and is most commonly used to refer to a hardpoint on the structure of military aircraft where external stores can be mounted. The hardpoint attachments are preferably of sufficient strength to withstand all intended operating conditions, or can be used with vehicles which operate within the load capabilities (i.e. speed/gravitational loads/altitude) of the casing. Such a load carrying structure, or 'hardback' as it is known in the art, may comprise an integral part of at least one casing section.

Providing a load carrying structure adds to the strength of the casing such that it can be used in a wide range of operating environments.

In one embodiment, the casing may be roughly cylindrical in shape along at least a portion of its length. In particular, the casing may be cylindrical in the region of the connections between the sections. Providing a casing which is cylindrical along at least a portion of its length is advantageous in at least the following ways. First, it provides good aerodynamic performance, further it encloses a relatively high volume of space for a given amount of external material and is simple to manufacture. Furthermore, if the casing is cylindrical in the region of the connections between the sections thereof, it may allow one section to be mounted to an adjacent section at any of a range of angles from 0-360°. In preferred embodiments, each casing section may be independently mounted at any angle relative to any other section. Of course, other shapes are possible and allow some freedom in relative rotation (e.g. four positions for square cross section, six for hexagonal and so on).

In one embodiment, the casing sections are joined by connectors arranged to interact with two adjacent casing sections. In one embodiment, the casing is cylindrical for at least a portion of its length and the connectors comprise split rings arranged to overlie and interact (or interlock) with portions of adjacent casing sections. Such connector rings also allow the relative rotation of sections (and the independence of rotation of sections), which enhances modular interchangeability and the adaptability of the casing configuration. The casing sections may comprise structural support ribs, e.g. rings, arranged to interact with the connectors. This provides a simple form of connection. The structural support ribs additionally provide support for the structure of the casing. Alternative connectors may include radial through bolts, (which may be pitched (preferably equally) around the circumference of the casing), over-centre type latch fixings (which again may be pitched (preferably equally) around the circumference of the casing and/or run parallel to the longitudinal axis of the casing), or the like.

In one embodiment, at least one casing section is arranged to receive an interface, for example in a cut-out portion thereof, wherein the interface allows information gathered by one or more sensor(s) housed in the casing to be accessed.

At least one casing section may comprise an access port arranged to allow access to the interior of the casing, preferably even when the casing is assembled and mounted on a vehicle. This allows the manipulation of and interaction with sensors within the casing.

At least one casing section may comprise an optical aperture, arranged to allow imaging equipment housed therein to capture images of the casing's surroundings.

The casing may further comprise pressure relief valves. Such relief valves may be arranged to allow the pressure inside the casing to be similar to the pressure outside, for example to within ±1 pound per square inch (psi). In such embodiments, at least one high pressure relief valve and one low pressure relief valve may be provided.

In a preferred embodiment, the casing, or at least one section thereof, may comprise an extruded and machined light alloy tube extrusion. Such a material is relatively light weight for its strength. For example, at least a section of the casing may be made of a tube of standard 6061-T6 aluminium alloy, which may be machined to reduce its thickness. Of course, other alloys, metals, and indeed other non-metal materials such as fibreglass or other composite materials may be used by the skilled person bearing in mind the intended operating environment. In one embodiment, at least one section may comprise a composite material (e.g. glass/epoxy). Such a material allows the formation of relatively complicated and/or detailed shapes but is still capable of withstanding a reasonable amount of applied force. Further, such a material is less disruptive to certain signals, such as GPS signals, when compared to a metal casing.

The casing may be arranged to house one or more of any of the following: a sensor (e.g. camera, radar transmitter/receiver, LIDAR transmitter/receiver, location sensor (such as a GPS device), any other sensor) a communication device, e.g. datalink for allowing the sensor to be read and/or controlled remotely, driver equipment for the sensor, a memory, a battery, an electronic control unit, a desiccator, an electronic interface, or the like In one embodiment, the casing has a length, weight, centre of gravity and/or centre of mass similar to that of standard apparatus carried by the platform/vehicle on which it is intended to be mounted. This is advantageous as it allows the casing to behave in a manner which is known from said standard apparatus when it is carried by the platform. In particular, where the platform is an aircraft, it allows existing flight data to be used to model expected behaviour of an aircraft carrying one or more casing according to the invention.

In some embodiments, the casing may include more than one of a given casing section. The casing sections may be connected symmetrically, i.e. any given casing sections may face in either direction of travel.

In some embodiments, the casing may comprise a bulkhead and/or baffle arranged between the nose section and the body section(s). This bulkhead and baffle may be provided as a single entity. This provides protection for any equipment in the remainder of the casing in the event that, in use of the casing, any part of the nose section fails.

Preferably, the casing is cleared for flight in both directions, i.e. may be flown with the nose section foremost. This adds to the versatility of the casing.

In one embodiment, the casing comprises a nosecone section, a first sensor section, a centre section, a second sensor section and a tail cone section. The first and second sensor sections may be similar or substantially identical. The centre section may be attached, for example permanently attached, to a hardback. The centre section may comprise a control electronics section and be arranged to house electronic equipment. At least one of the first and second sensor sections, the nose cone section and the tail cone section may be arranged to house one or more sensors, for example imaging equipment. In embodiments housing imaging equipment, the sections may comprise optical apertures.

According to a second aspect of the invention, there is provided a casing arranged to be mounted on an aircraft which is cleared for flight in both a first and a second direction. The casing may be a longitudinal casing having a first and second end which is cleared for flight with either the first or the second end foremost. The casing may have ends which are similar in form (i.e. have substantially indistinguishable nose and tailportion) or may have ends which are different but both suitable to act as either a nose or a tail portion. The casing may be a casing according to the first aspect of the invention, and/or may be a 'pod' for an aircraft.

According to a third aspect of the invention, there is provided a housing for imaging equipment, wherein the housing is arranged to be used in high speed airflow, and the housing a tapering form having symmetrical angular truncations such that it tapers in the form of a wedge formed by two substantially planar regions, wherein at least one substantially planar region is provided by an aperture comprising a plate of optically transparent material.

The 'wedge' shape provides a good level of aerodynamic performance. Although a dome of some form (e.g. spherical, elliptical, ovate, ogive etc.) as is known for nosecone design could be used if aerodynamic performance only was to be considered, and would have some advantages in that it provides an option for 1-piece construction and full rotational symmetry (and therefore even loading), such domes can produce self-imaging or 'narcissus' effects, where a camera captures its own reflection. By using a plate rather than a curved optically transparent window, this is avoided.

The underlying (un-truncated) shape of the housing may have any form, in particular a symmetrical tapering form e.g. conical, ogive, parabolic, semicircular, etc, as may be familiar from nosecone design. In one example, the housing comprises an ogive with a symmetrical angular truncations. Further, the housing may be a relatively slender ogive as such a shape has improved aerodynamic properties compared to other ogives with symmetrical angular truncations.

In some embodiments, both planar regions may be provided by optically transparent materials. Providing such a 'wedge' allows an optical window on both sides, allowing an almost complete hemispherical potential field of view for imaging equipment, or other sensing equipment, mounted in the housing.

The housing may be formed as a nose section of the casing according to the first aspect of the invention.

The body of the housing may comprise a composite material. As will be familiar to the skilled person, such a material is relatively strong for it weight. The housing may further comprise a leading edge strip, which may be arranged to provide additional support at the junction between the optically transparent material and the rest of the housing, and, in embodiments where more than one optically transparent plate is used, between the optically transparent plates where they come together at the thin end of the wedge. It will be appreciated that the term 'leading edge' would be understood by the skilled person to be the edge which moves through the air (or towards which the air moves), cutting through or parting the airflow, i.e. the wedge is arranged to taper towards a leading edge of the housing.

This is advantageous as there can be manufacturing difficulties in forming a robust joint between optical plates (e.g. glass) which is capable of surviving longer term effects of use in a high airflow environment (e.g. the effects of heat, pressure and abrasion). This leading edge strip may comprise a tough, corrosion resistant material, such as corrosion resistant steel. The support provided may be support in view of the additional pressure experienced by the leading edge of the wedge as it moves though the air, or the high temperatures experienced by the leading edge of the wedge, or both in particular at high speeds. To assist in dissipating heat, in some embodiments, the leading edge strip may comprise a heat conducting material (corrosion resistant steel also has appropriate heat conducting properties although other materials will be familiar to the skilled person). In addition, providing a strip of material at the very front of the leading edge may be advantageous as it may deflect abrasive material which would otherwise impact (and possible scratch) the optically transparent plate(s).

The optically transparent plate(s) may comprise glass, for example toughened glass. The optically transparent plate(s) may comprise a coating, such as an optical coating (e.g. antireflective coating or a filter) or a self-cleaning coating. Preferable, the plate(s) are optically flat. Such features allow for high quality imaging and the use of self cleaning/hydrophilic glass, (in which a 'treatment' may be added into the outer layer of the glass as part of the manufacturing process). In one such example, a titanium dioxide coating is integrated with the outer glass layer. Use of such glass reduces or removes the need for protection shutters as are used in prior art devices while images are not actually being acquired as contamination accretion is minimized.

Where two plates are used, the plates are preferable similar, more preferably substantially identical. In any case, the housing is preferably symmetrical. Both such features both contribute to ensuring that symmetrical forces are experienced by the housing and allow for a balanced aerodynamic performance.

The housing may further comprise a base region which is substantially cylindrical in shape. Such a base region provides an area in which the imaging equipment and/or additional sensing equipment may be housed.

In preferred embodiments, the wedge has an internal angle of approximately 40-45°. Such a wedge angle provides a suitable compromise between aerodynamic and imaging considerations. A very acute angle would result in a relatively long optically transparent plate and, in turn, housing length, which has advantage in terms of aerodynamics, but a flat plate perpendicular to a camera lens axis is ideal for imaging (although not totally necessary provided 'narcissus' effects are avoided). In particular, a sharp angle provides for good imaging (the leading edge of corrosion resistant steel is barely visible by camera) but the nosecone should also be kept short in order to keep mass and volume down: an unnecessarily long structure would waste space. Of course, in environments where different challenges are faced, there could be an alternative preferred angle for the wedge and indeed, the housing may have a different preferred shape depending on the sensor housed therein.

Limits are placed on the internal angle of the wedge by the intended speed of operation. For example, a completely square nose cone is feasible if only low speed air flow is to be encountered. By contrast, 40-45° is a suitable value for the speed of military vehicles such as the Tornado aircraft. If high subsonic or supersonic flight is to be contemplated, the internal angle should be as small as possible, perhaps 10°-30°. Therefore, the internal angle might typically fall in the range 30-50° for the imaging applications described in the specific description, but could also fall outside this range.

According to a fourth aspect of the invention, there is provided a casing for sensor equipment arranged to be mounted on the exterior of an aircraft, the casing being arranged such that, in use, it exhibits similar characteristics in flight to known aircraft stores.

This allows the casing to be treated by the aircraft/flight crew in a similar, if not identical, way to the way in which the known store is treated, simplifying clearance of the casing for flight, determining flight plans, fuel usage, the effect of the casing on aircraft handling, and the like. As will be familiar to the skilled person, for computer controlled flight systems (e.g. military aircraft and particularly fighter jets), factors such as a store's mass, centre of gravity, inertia, positions, etc are used by the aircraft flight control computer to determine the optimum flight control limits of the aircraft. A casing which acts as a 'surrogate' version of the known store allows the aircraft to fly in a way that is already well understood from analysis of such aircrafts carrying the emulated store, and, by closely emulating such aspects of a known store can be carried without any associated flight restrictions or limitations being applied to the host aircraft and/or removes the requirement for costly reprogramming of flight computers to enable carriage of the casing.

The casing may be casing according to the first or second aspect of the invention.

In order to exhibit similar flight characteristics, the casing may be arranged such that at least one of the following qualities/quantities is similar to that of a known store: weight, centre of gravity, inertia centre of mass, length, and the like. Where applicable, the qualities/quantities should be within about 5-10% with those of a known store. The cross sectional area is advantageously also similar but in many practical examples, such casings would not enclose a sufficient internal volume to house the necessary equipment. The effect of this difference on flight characteristics can be relatively easily modelled and incorporated into existing flight plans.

Examples of known stores which could be emulated by the casing are AIM9/L Sidewinder or ASRAAM missiles, or the like. As will be appreciated by the skilled person, the Sidewinder and ASRAAM missiles are two stores in a family (as defined by their weight/size) of weapons that are the most widely used by military aircraft. Their physical characteristics are widely publicly available (see for example, reference sources provided by IHS Jane's, amongst many other sources) and accord with published standards. Therefore, emulating their characteristics is particularly useful.

According to a fifth aspect of the invention, there is provided a casing according to the first, second or fourth aspect of the invention in combination with equipment comprising at least one of the following: sensor (e.g. camera, radar transmitter/receiver, LIDAR transmitter/receiver, location sensor (such as a GPS device), any other sensor) communication device, e.g. for allowing the sensor to be read and/or controlled remotely, driver equipment for the sensor, memory, battery, electronic control unit, desiccator, electronic interface, or the like.

According to a sixth aspect of the invention, there is provided a method of imaging a store release from an aircraft comprising mounting a casing according to the first, second or fourth aspect of the invention on an aircraft, the casing housing at least one camera, a triggering mechanism and a battery, the method comprising automatically triggering the camera to record the store release.

The triggering mechanism may comprise at least one of the following: a break-wire mechanism, a pressure gauge, a heat sensor, an imaging device arranged to detect a change in the visual image, a photovoltaic cell or the like.

The memory may be arranged to store video images captured by the camera and to partition portions of the memory relating to a predetermined time before and after the triggering mechanism operates.

According to a seventh aspect of the invention, there is provided a baffle comprising two opposed faces, the faces containing there between a series of channels and comprising a plurality of holes on each face, wherein each hole is arranged to allow air ingress to and or exit from a channel, the arrangement being such that air entering a channel via a hole on one face must pass to a different channel to exit the baffle via a hole formed in the opposed face.

Such a baffle will slow air incident thereon, limiting the force of the airflow downstream of the baffle.

In one embodiment, the channels associated with the holes in the first face are at an angle, for example perpendicular, to the channels associated with holes formed in the second face. This causes a change in direction of the airflow, and will therefore slow it down.

In one embodiment, the faces are formed of two separate plate elements. The channels may be formed as indentations in the plate elements, and may provide ribs on the faces. The plate elements may be secured together to provide the baffle. (The design ensures the stiffness and strength required in the event of an extreme overpressure situation) This provides for easy manufacture.

The channels may be linear. This again results in easy manufacture. Alternatively, the channels may themselves contain corners and/or curves to further slow the airflow.

In one embodiment, the baffle is arranged to act as a bulkhead within a casing according to the first, second and/or fourth aspects of the invention described above. This bulkhead may be placed between the nose section and the remaining sections.

The preferred features may be combined as appropriate, as would be apparent to a skilled person, and may be combined with any of the aspects of the invention.

In order to show how the invention may be carried into effect, embodiments of the invention are now described below by way of example only and with reference to the accompanying figures in which:

FIG. 1 shows an assembled casing for housing sensor equipment and arranged to be attached to a platform such as an aircraft;

FIG. 2a-c shows a nosecone section of the casing of FIG. 1;

Figure 1:
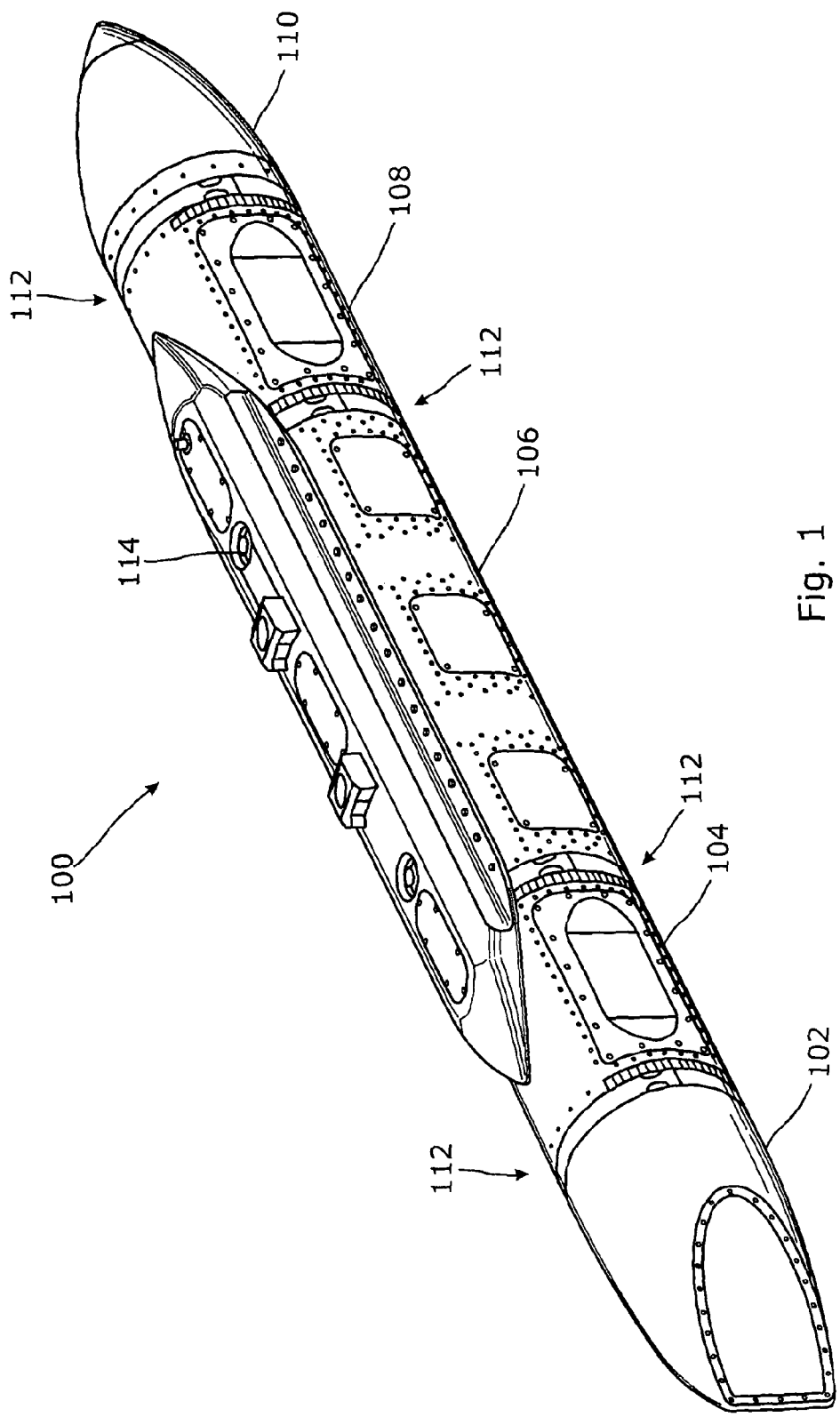
Figure 8A:
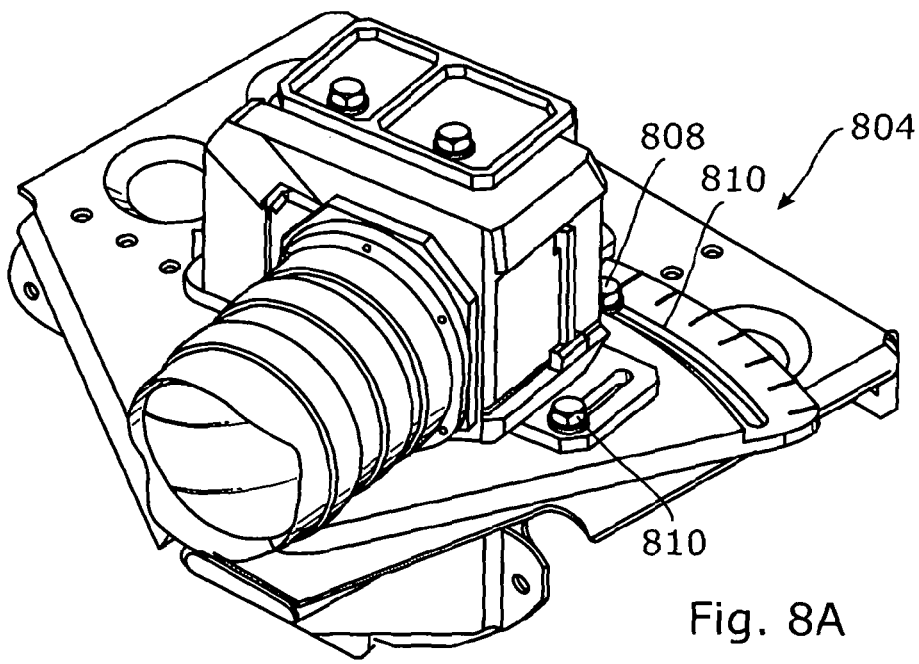
Figure 8B:
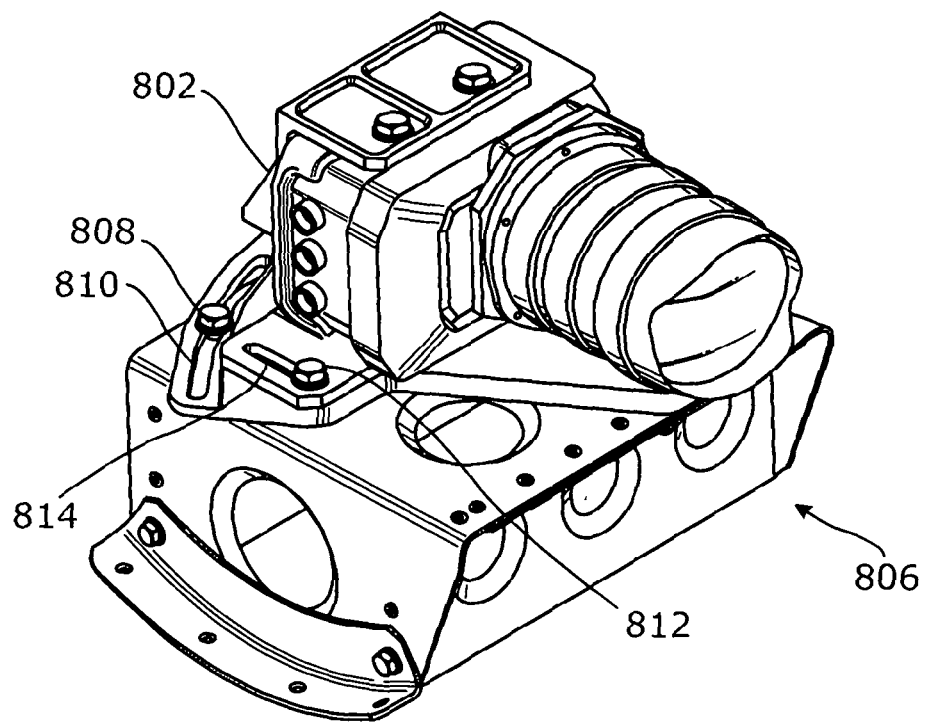
Figure 9:
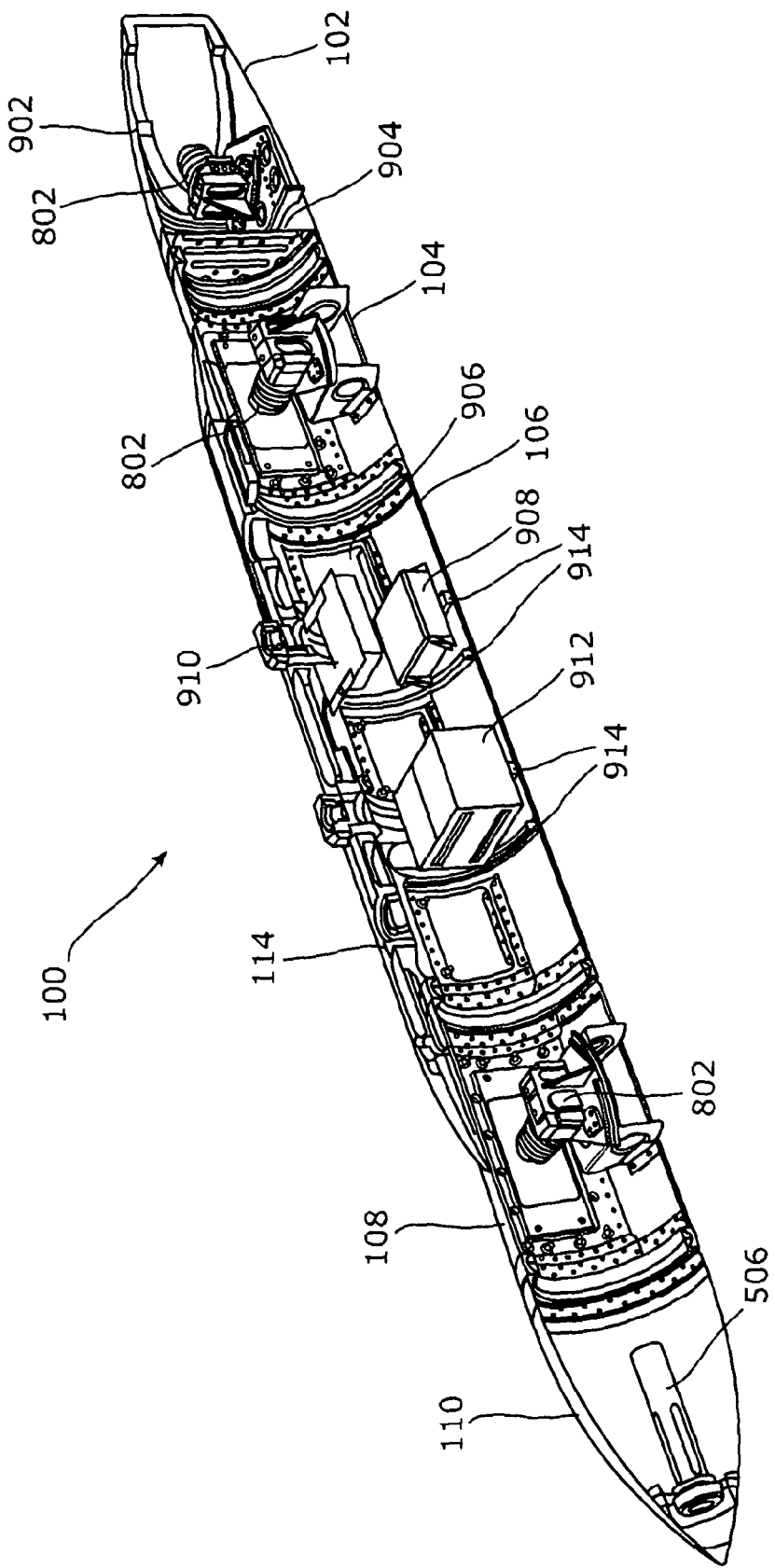
Figure 10:
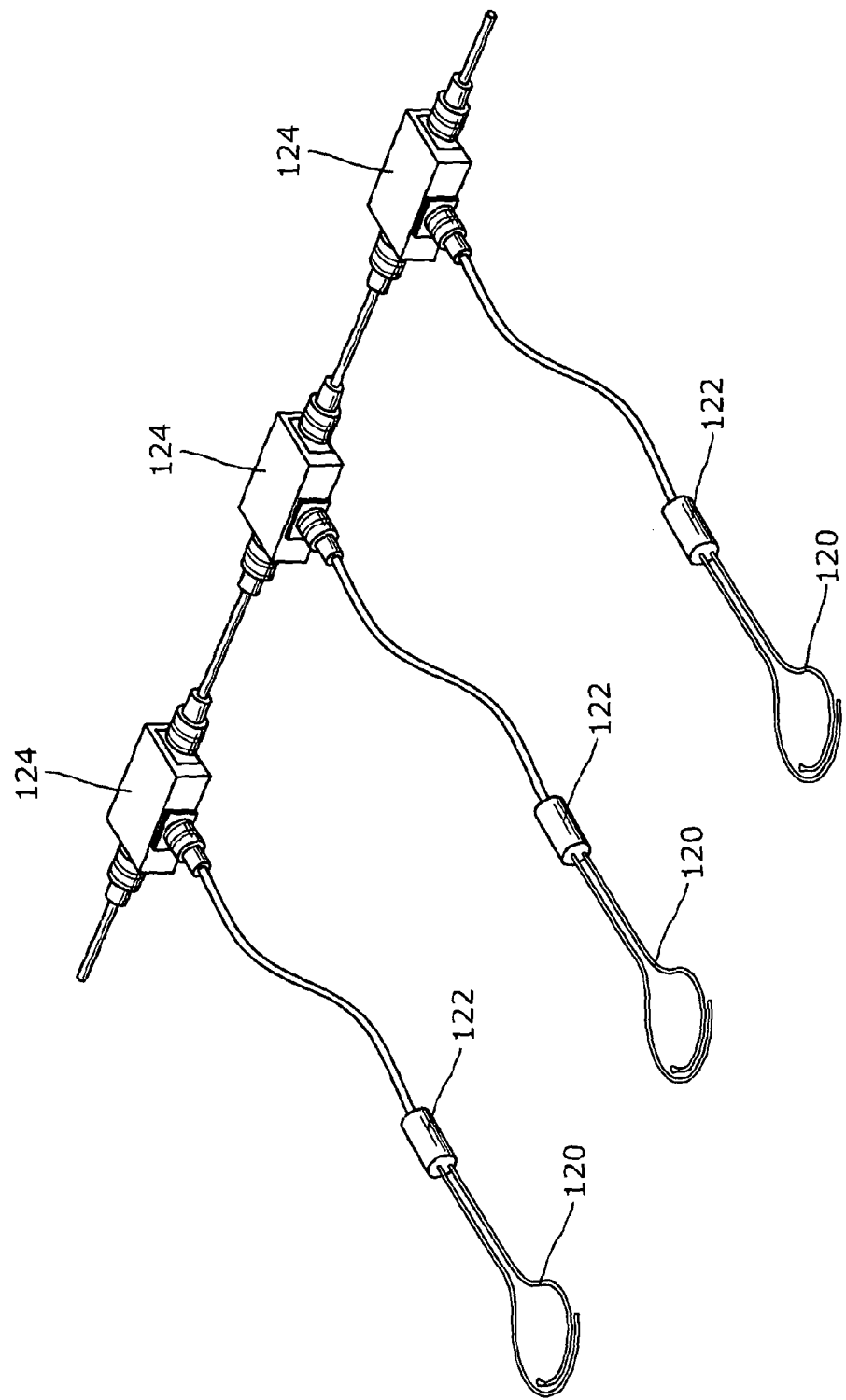
Figure 11:
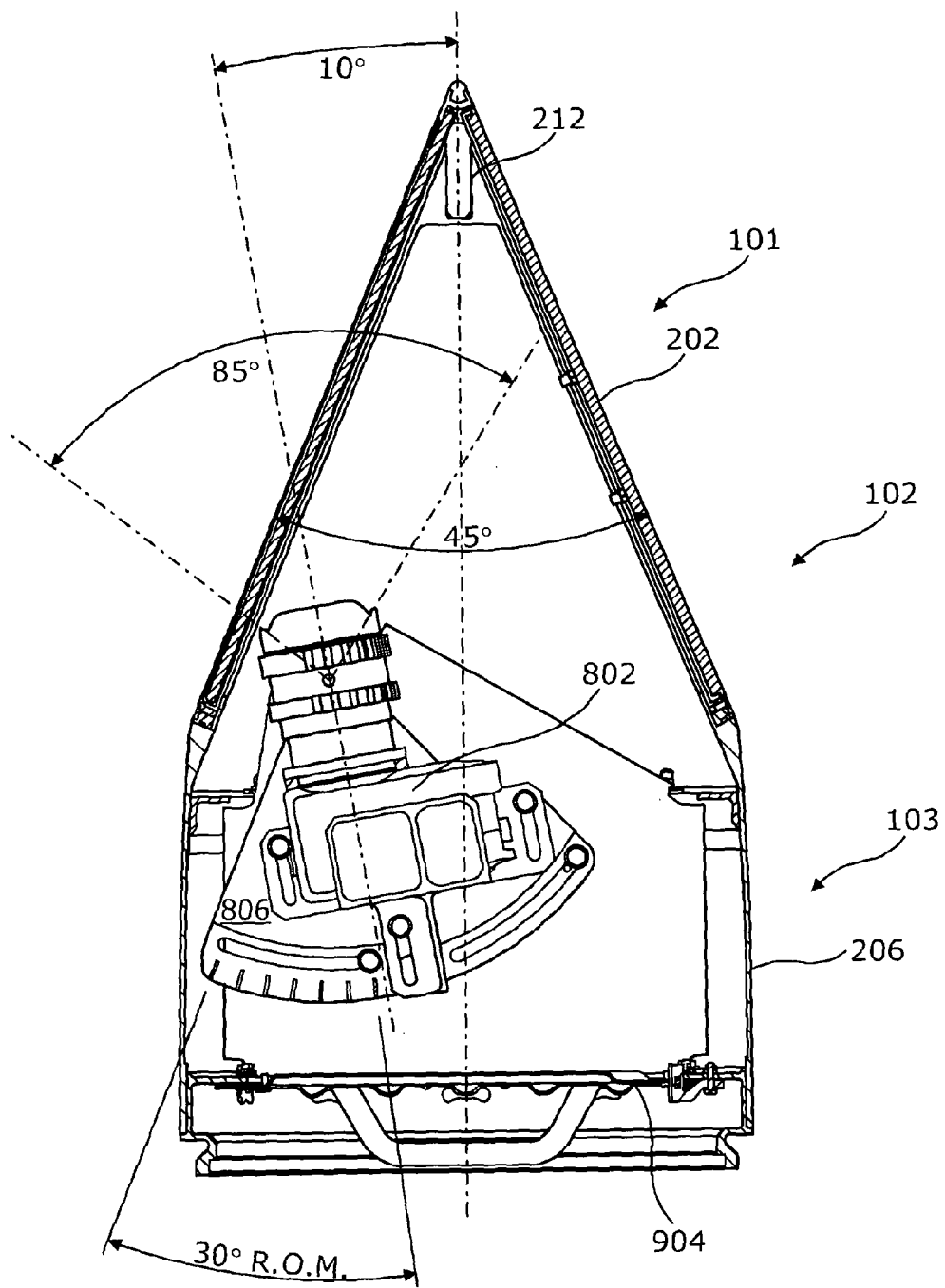
Figure 12:
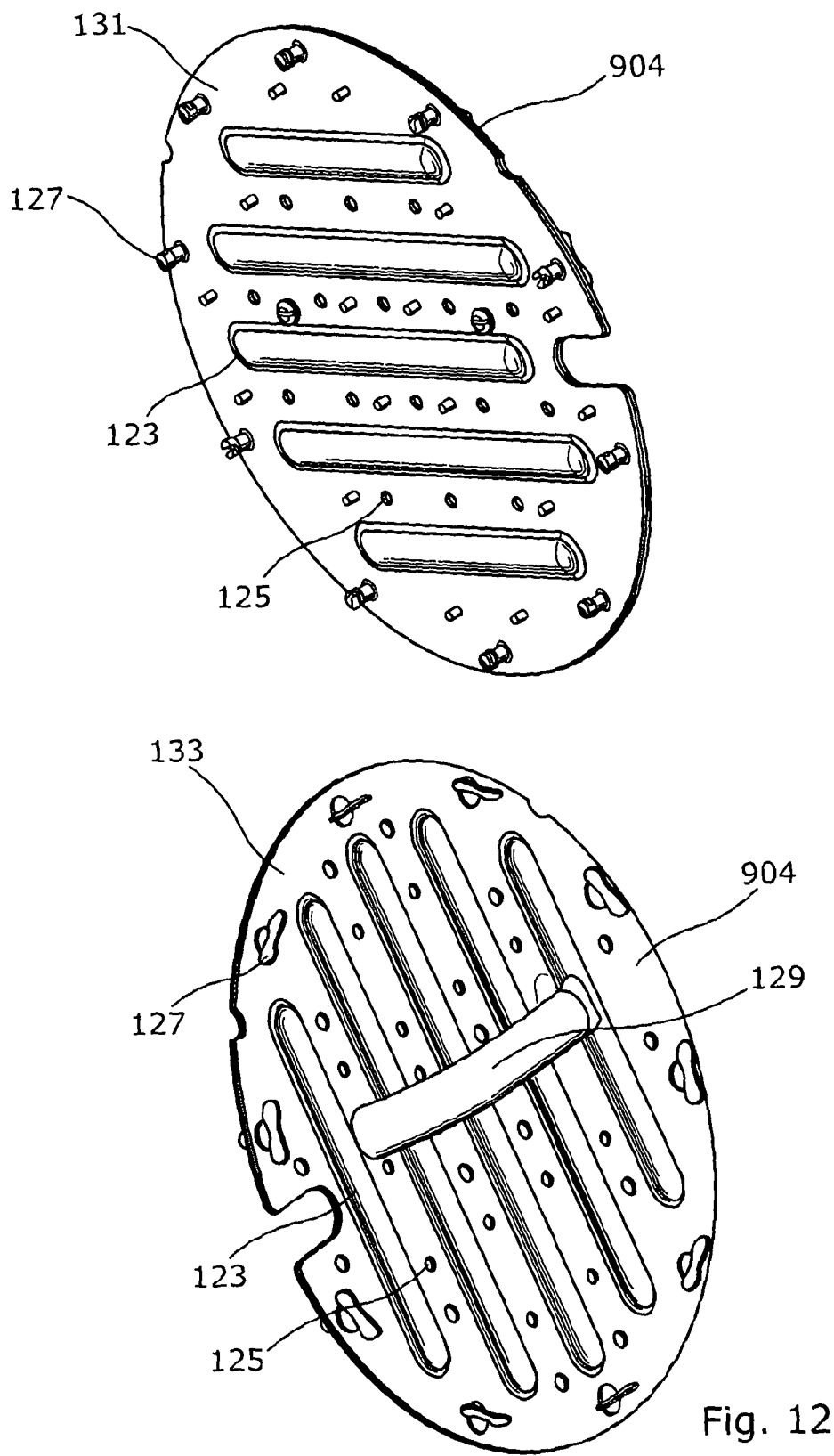

FIGS. 6a-c show a connector arrangement for connecting sections of the casing of FIG. 1;

FIGS. 7a-c show a hardback and an adaptor rail, arranged to allow the casing of FIG. 1 to be mounted on a platform such as an aircraft;

FIGS. 8a and 8b show cameras mounted on mountings arranged to be carried within the casing of FIG. 1;

FIG. 9 shows a cross section of the casing of FIG. 1 including equipment mounted therein;

FIG. 10 shows a triggering system;

FIG. 11 shows detail of a camera mounted in a nose cone section according to one embodiment of the invention;

FIG. 12 shows front and back faces of a bulkhead; and

Figure 13:
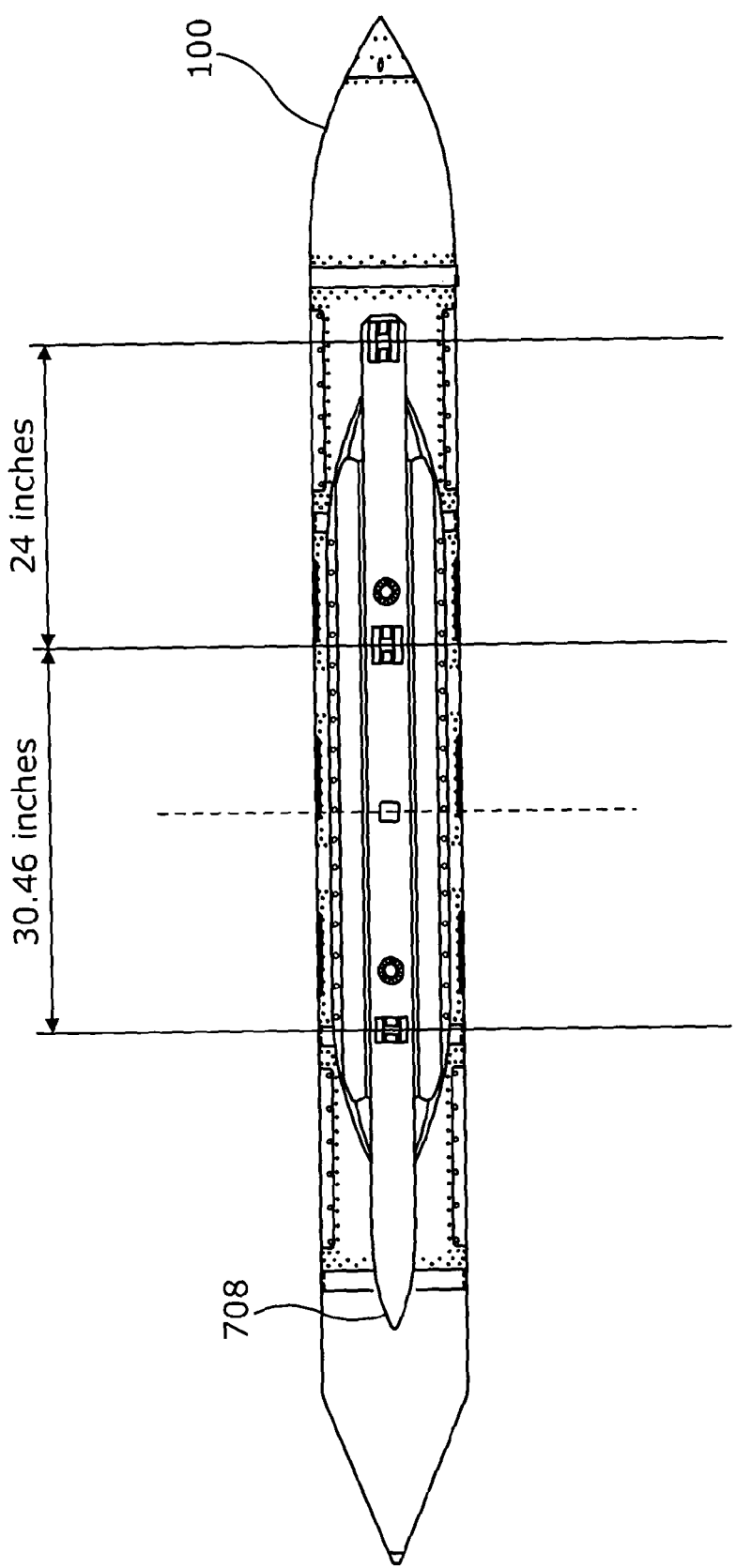

FIG. 13 shows a top view of an assembled casing.

FIG. 1 shows an assembled casing 100 according to one embodiment of the invention. As explained in greater detail below, this casing 100 is arranged to be mounted on a high speed vehicle (for example an aircraft which can travel at up to Mach 1.6) and provide protection for apparatus carried therein in challenging environments. In this example now described, the casing 100 is intended to travel at altitudes of up to of 40000 ft. However, the casing 100 is also suitable for mounting on other vehicles, for example helicopters, large transport and U.A.Vs where the environmental challenge may be more associated with vibration and acceleration than with speed.

The casing 100 comprises 5 sections: a nosecone section 102; three body sections comprising a first sensor section 104, a control electronics section 106, a second sensor section 108; and a tail cone section 110. The sections are linked with connectors 112. The casing 100 further comprises a hardback 114. Each of these components is described in greater detail below.

The body sections 104, 106, 108 and tail cone section 110 of the casing 100 are substantially made of extruded and machined light alloy tube extrusion, supported by structural elements. In this embodiment, the connectors 112 interact with support rings made of corrosion resistant steel which provide structural elements, as described further in relation to FIG. 9 below. Additional support is provided by the hardback 114, which is fixed to the control electronics section 106, and further internal support ribs, which are described in greater detail below. The use of light alloy machinings allows the casing to be relatively lightweight (approximately 88 kilograms when including the interface assembly described herein after), while still providing a robust structure capable of operating in a high speed, high force (for example gravitational forces) and high vibration environment.

The casing 100 is arranged to house up to four cameras (although in the described embodiment, only three are shown—and additional camera could be housed by replacing the illustrated tail cone section 110 with another nosecone 102 to produce a 'double ended' casing 100 (the second nose cone therefore acting as a tail cone). The structure is relatively compact by design.

The shape of the casing 100 is such that the tail cone section 110 can be placed at the lead end of the casing 100 without adversely affecting behaviour in flight, i.e. the casing may be cleared for flight in either direction.

The modular, section-based structure makes the casing 100 adaptable, enabling future modification, and expansion to new roles, in particular other sensing or monitoring roles. It also allows for cost effective manufacture, maintenance and operation. The casing 100 may be expected to have a long—for example 20 year—life expectancy. The casing 100 is further arranged to allow for simplified servicing, data download from sensors housed therein, and minimum turn round time compared to existing sensor casings.

The hardback 114 provides strength to the casing 100 and (in some examples in conjunction with an adaptor rail as detailed below) allows for multi platform compatibility, but in order to make practical use of this, the casing 100 should be capable of performing its protective function on all such platforms, preferably without disrupting the platforms themselves. In the terms of the art, a large 'operating envelope' is desired to take advantage of the adaptability.

FIGS. 2a-c shows detail of the nosecone section 102, which provides a housing for imaging equipment. As can be seen from the Figures, the nosecone section comprises a 'wedge' shaped section 101 with a substantially cylindrical base region 103 which may be mounted within casing 100 at any angle, i.e. may be rotated at any position through 360° around the longitudinal axis of the casing 100 relative to the position shown in FIG. 1. The 'wedge' is formed of two optically transparent plates, in this example glass panels 202 mounted to a machined aluminium frame 204 which is fixed to a body formed as a composite shell 206 which is manufactured from a glass/epoxy composite.

As can be seen from the illustration of the shell 206 in isolation in FIG. 2C, and the detail of the end of the nosecone section 102 (with the glass panel removed to show the interior detail) in FIG. 2B, the shell 206 comprises an internal bezel 210 arranged to retail a glass panel 202.

The nosecone section 102 as a whole is broadly a slender ogive shape with flattened sides (or symmetrical angular truncations) as it narrows, resulting in a leading edge. The leading edge of the nosecone section 102 is formed of a corrosion resistant steel leading edge strip 212 which is bonded in to complementary cut-outs in the shell 206 (see FIG. 2B in particular). This leading edge strip 212 cuts through the air, taking the brunt of any impact from abrasive material (and therefore serves to provide some protection to the glass panels 202). It also assists in heat dissipation (as will be appreciated by the skilled person, the leading edge or tip of a nose cone may get hot as it moves through the air at high speed). The configuration described also means that the glass panels 202 are not directly bonded to one another: obtaining a glass/glass bond of sufficient strength is a technical challenge which is avoided by use of the intervening strip.

The glass panels 202 provide 'aperture flats', and are manufactured from high strength glass and are optically flat. The panels 202 are manufactured to be very similar, preferably identical, to reduce adverse asymmetric aerodynamic loadings to the casing 100 and its platform (i.e. the vehicle on which it is mounted).

As will be appreciated, it may be the case that imaging is only required through one of the panels 202, in which case, the other panel may be shielded or replaced with an opaque panel to minimise the radiation received, and therefore potential unwanted reflections, glare and the like. Alternatively, the shell 206 may be arranged to receive a single panel, the other planar portion being provided by the material of the shell 206.

The interior of the nose cone section 102 (and indeed any section housing imaging equipment) may be painted matte black to minimise such reflections.

The 'wedge' of optically flat glass provides a camera mounted in the nosecone section 102 a near hemispherical field of view with virtually no obscuration. Although the frame 204 and/or leading edge strip 212 may appear in some images, in the present example, such obscuration will likely be of little relevance as, in this example, the camera is intended to capture a dropping store which will not be directly ahead and such obstructions will be of little relevance as they will be on the periphery of the target image. In addition, a parallax effect when looking directly forward through similarly angled transparencies has been shown to cause the leading edge to disappear from images.

The internal angle for the nosecone 'wedge' is, in this example, 45° and is selected as a suitable compromise based on the conflicting requirements for wide forward camera field of view, transparency size, reduction of 'narcissus effect' caused by internal reflections, supersonic operation loads with airflow stagnation, kinetic heating and localised airflow disruption effects. Although a small internal angle is particularly suitable to counter adverse aerodynamic effects, a flat plate perpendicular to the camera lens axis is ideal for imaging (although not always strictly necessary provided that 'narcissus' effects are avoided). In addition, it is generally desirable that nosecone section 102 should not be too long as such a longer nose cone section 102 will have an associated higher mass and more 'unusable' internal space.

Of course, in environments where different challenges are faced, there could an alternative preferred internal angle for the wedge. It will therefore be appreciated that the nosecone section 102 described herein is selected for a particular purpose and in other embodiments different considerations may apply, for example to optimize for any particular sensor and/or intended operating conditions. The nose cone 102 could readily be replaced with a nose cone of a different design so long as the interconnectivity with the adjacent section remains consistent. An example method of connecting the sections is described in greater detail below.

The high strength glass used in the panels 202 has a hydrophilic self cleaning property which reduces imaging problems associated with rain and dirt accretion.

The base region 103 of the nosecone section 102 is open and comprises a structural interface ring 208. Each of the sections 102-110 comprise at least one such ring 208, as described in greater detail below. The rings 208, which in this embodiment are made of corrosion resistant steel, are arranged to provide strength to the structure of the casing 100 when assembled and also to provide an interface allowing coupling to an adjacent section 102-108 using connectors 112.

Initial aero load Computational Fluid Dynamic models of a nosecone section 102 design as described herein suggest that, for an aircraft moving at Mach 1.2 at 1000 ft above ground level there is a maximum expected localised stagnation temperature of 369K and pressure of 236 Kp, which the materials and forms used for the nosecone section 102 are able to withstand.

The nosecone section 102 is arranged to house a high speed digital camera on an adjustable mount and a GPS antenna used with an Inter Range Instrumentation Group (IRIG) unit for accurate time stamping of gathered imagery. As an alternative, a datalink antenna could be used. These components are described in greater detail below.

Figure 3:
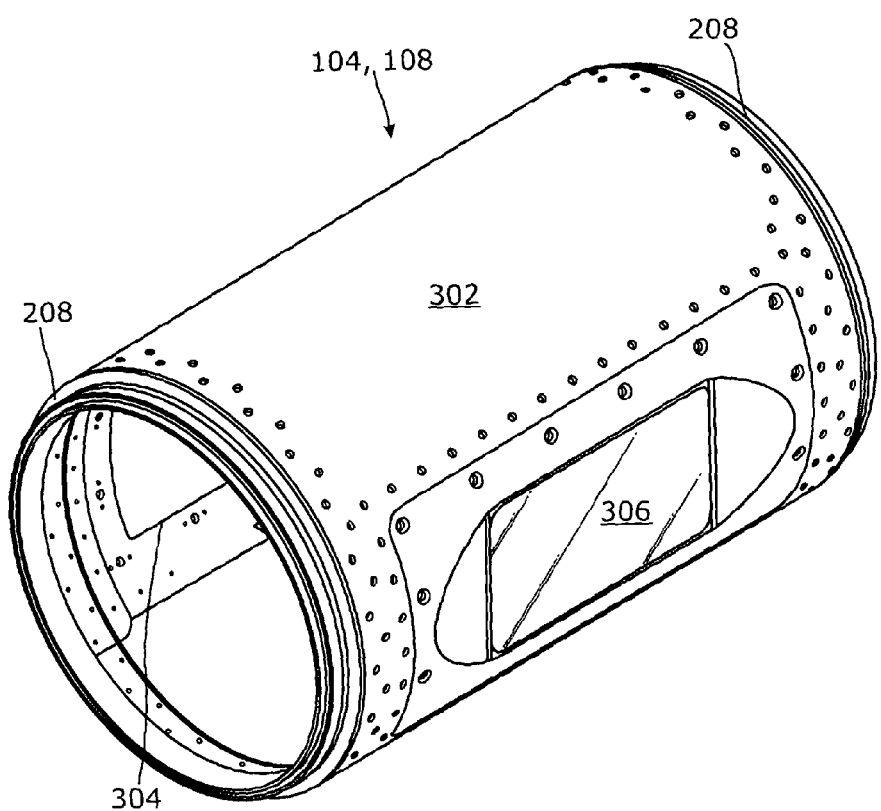
FIG. 3 shows a section of the casing of FIG. 1 arranged to house sensor equipment.

The nosecone section 102 is arranged to be connected to a first sensor section 104. The first 104 and second 108 sensor sections in this embodiment are substantially the same and their structure is as shown in FIG. 3.

The sensor sections 104, 108 in this example comprise a cylindrical body 302 with cut outs, machined from a single machined light alloy tube extrusion. The body 302 comprises a structural interface ring 208 about each end and has two cut out portions which are opposed on either side of the length of the cylinder and arrange to receive, interchangeably, an access panel 304 and a glass panel 306. The sensor sections 104, 108 are attached via the connectors 112 to the adjacent sections. Each of the sensor sections 104, 108 may be mounted at any position, although this is limited in practical terms to 110° in the present embodiment as the ends of the hardback 114 protrude over the panel 306: if the sections 104, 108 were rotated to face the hardback 114, the camera view would be obscured. The whole section rotation reduces the need for an internal camera adjustment mechanism in elevation relative to the pod C/L and also minimizes the vertical aperture size required (as the skilled person will appreciate, if the overall cross section of the casing 100 can be kept small, benefits such as reduced mass, lower aerodynamic load and fewer structural complications are seen). In this example, and as described in greater detail below, the cameras are mounted on a base plate enabling 30° azimuth adjustment.

The access panel 304 is a quick release panel which allows a sensor, for example a camera or GPS unit, carried in the sensor section 104, 108 to be readily accessed. In this embodiment, the fastenings are 'Tridair' quick release fastenings manufactured by Alcoa Inc, but other fastenings will be familiar to the person skilled in the art.

The glass panel 306 comprises high strength glass which has a specialized hydrophilic self cleaning property to reduce imaging problems associated with rain and dirt accretion. In addition, in some prior art camera casings, in particular camera pods for aircraft, shutters were provided such that the panels could be covered when no imaging was being carried out. Although such shutters may be provided (for example to obscure a panel when not being used as an aperture), such a coating reduces the need for shutters and therefore can provide additional benefits in terms of reduced complexity and weight.

Figure 4:
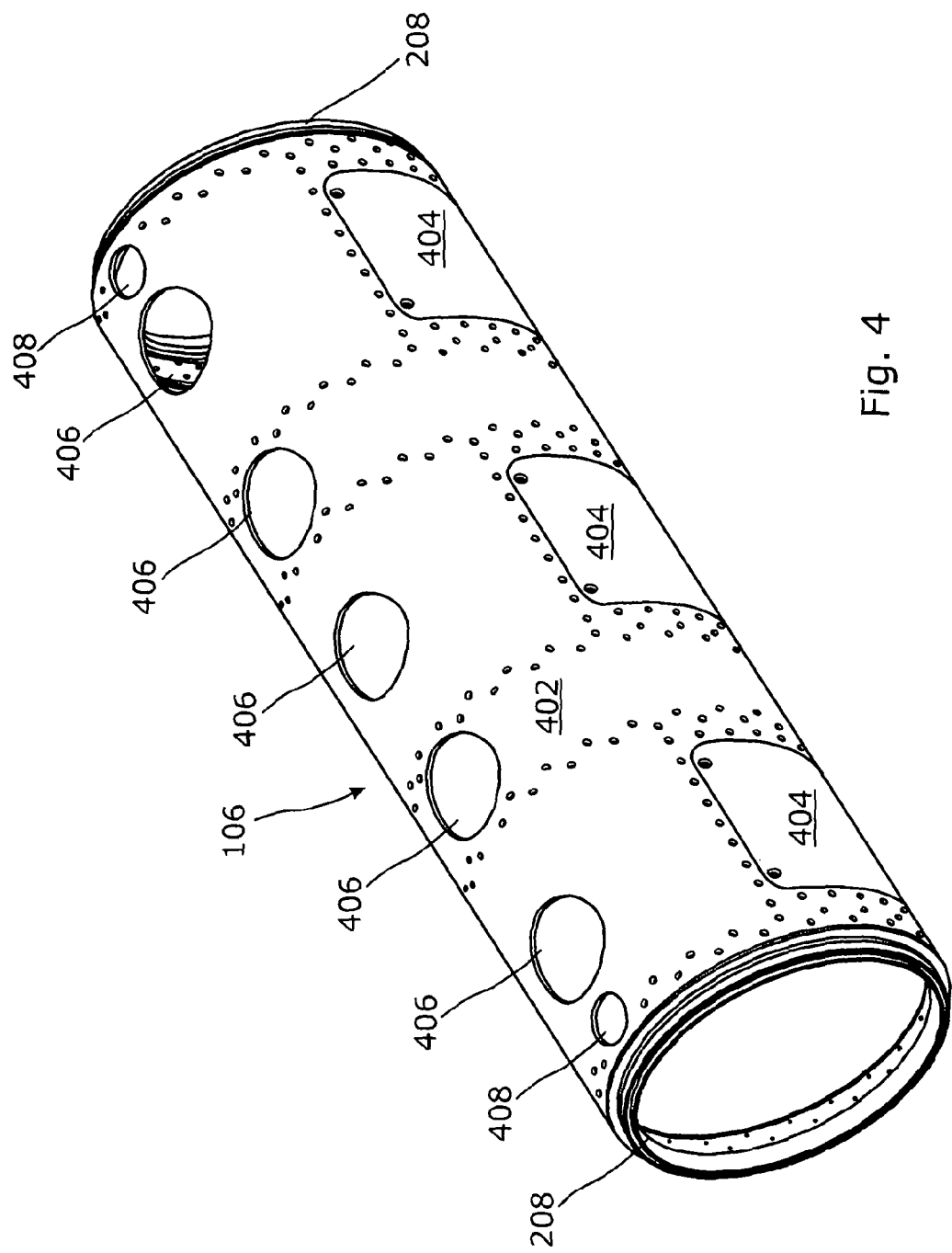
FIG. 4 shows a section of the casing of FIG. 1 arranged to house electronic equipment and interfaces.

The control electronics section 106 is shown in FIG. 4 comprises an open cylindrical body 402 machined from a single 4 mm thick machined light alloy tube extrusion with a number of—in this embodiment six—substantially rectangular cut out portions. The control electronics section 106 is terminated at each end of body 402 with structural interface rings 208. Five of the cut out portions carry quick release access panels 404 mounted therein, which are arranged to allow easy access to equipment stored therein, for example enabling easy battery changes. The sixth is arranged to carry a control and interface panel mounted therein. As described in greater detail below, such an interface may provide external power supply connection, digital data download and upload facility (via laptop interface), system test and monitoring and the like.

The control electronic section 106 further comprises five ports 406 arranged along the length of the control electronic section 106 and provided to receive (in this example, permanent) attachments for the hardback 114 and/or valves as described below. The control electronic section 106 further two cable access ports 408, one at each end thereof.

Although not visible in FIG. 4, to ensure that the control electronic section 106 loadings are distributed to the hardback 114, and there is sufficient stiffness around the access panels, it further comprises four internal light alloy support rings—these rings can be seen in FIG. 9.

These rings also form mounting structure for internal equipments. The control electronic section 106 in this embodiment is arranged to carry quick change lithium Ion batteries, IRIG time-code generator and an Event Trigger Control unit.

Figure 5:
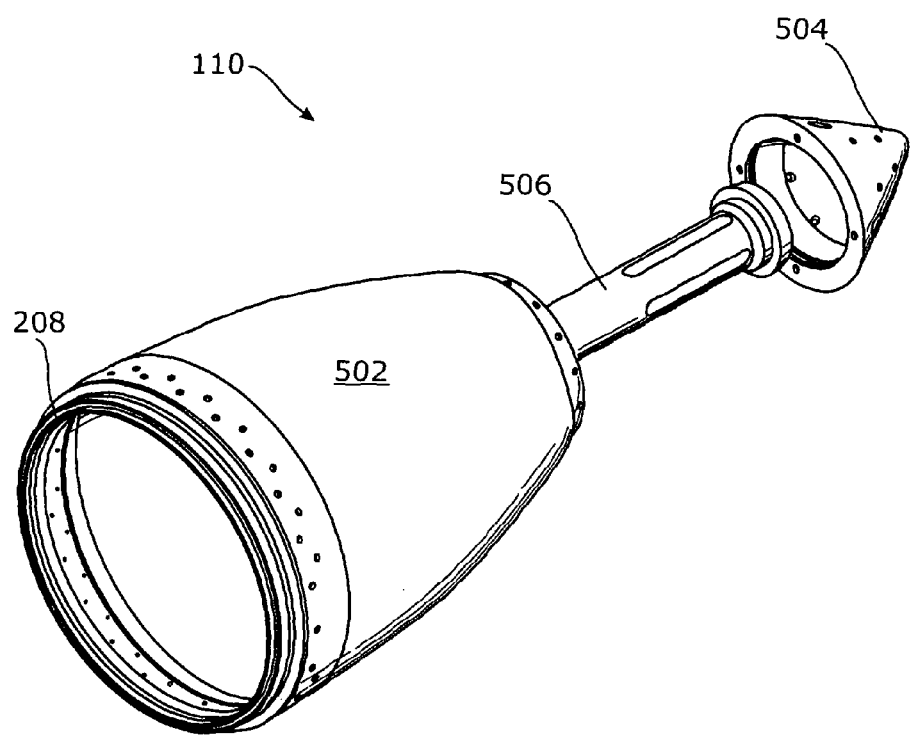
FIG. 5 shows a tail cone section of the casing of FIG. 1.

An exploded view of the tail cone section 110 is shown in FIG. 5. The light alloy tail cone section 110 is an 'aerodynamic fairing', comprising a substantially frustro-conical body 502 with curved side walls and a quickly detachable cap 504, which completes the rounded conical shape, i.e. an 'ogive'. The cap 504 also acts to secure a desiccator 506, which is housed within the body 502 of the tail cone section 110. The desiccator 506 in this embodiment is a removable molecular sieve desiccator and incorporates a status indicator, in this example having a working capacity of 280 litres.

At the base of the cone shape, the tail cone section 110 comprises a structural interface ring 208.

This tail cone 110 can be substituted for a nosecone 102 section, enabling additional rearward imaging if desired. Indeed it will be appreciated that the tail cone design may be readily adapted without unduly effecting aerodynamic performance in many circumstances: an alternative shape, even a squared off end, may be used in a range of circumstances. The tail section is therefore any section intended to be mounted at the rear of the casing as it is moves relative to the air flow.

The sections 102-110 of the casing 100 are fixed together using connectors 112, which in this example comprise split rings, as shown in greater detail in FIG. 6a-c. FIG. 6a shows detail of a cross section of two structural interface rings 208a, b held together by a split ring connector 112.

In the illustrated embodiment, one of the structural support rings 208a is mounted within the nosecone section 102 and includes a flange 604 arranged to retain a bulkhead described in greater detail below. The two rings 208a, 208b are complementary, forming a physical overlap. The connector 112 ensures that the overlap is maintained (i.e. that the sections do not slip apart) but it is the material of the rings 208a, 208b which provide the structural strength of the joint. In the embodiment described herein, each of the intermediate sections 104, 106, 108 has a paired set of rings 208 at each end such that each can be rotated about its length.

FIG. 6b shows the two semicircular connector elements 602a, 602b which may be clamped together using bolts inserted as shown by the dotted lines in FIG. 6c.

The use of such split rings provides simple assembly and disassembly, which in turn allows sensors and equipment carried in the housing to be readily accessed and/adjusted. The system also allows the sections to be re-arranged, modified, replaced or added to, which means that the casing 100 is adaptable. It will be noted that one type of connector 112 is used to connect each section, simplifying the design. Alternative types of connectors 112 will however be familiar to the skilled person such as radial through bolts equally pitched around the circumference of each joint, over-centre type latch fixings equally pitched around the circumference and running parallel to the casing 100 axis or the like.

FIGS. 7a and 7b show respectively perspective views of the top and the underside of hardback 114, i.e. an integral, stiff load carrying structure which is arranged to form the primary connection from casing 100 to a host vehicle. The hardback 114 is arranged to be attached to the control electronics section 106 and comprises and elongated lozenge-shaped body made of a one piece machined aluminium structure, in which a number of ports are formed. In particular, the hardback 114 comprises three access panels 702 which are covered by detachable plates 703 in the embodiment of FIG. 7 but in other embodiments may carry interface panels which are connected to apparatus housed within the control electronics section 106. Two of these access panels 702 are arranged to align with the cable access ports 408 of the control electronics section 106 when the casing 100 is assembled, the central access port overlying the central port 406 of the control electronics section 106. The access panels are sized/positioned such that they are compliant with known MIL-STD-8591H aircraft interfaces. This standard is readily available from various sources The hardback 114 further comprises two±1 psi pressure relief valves 704 which both operate in an over and under pressure condition and are arranged such that, when the casing 100 is assembled, they are in fluid communication with the interior of the sections of the casing 100, allowing the pressure within the casing 100 to be controlled or to equalise with its environment. The pressure relief valves 704 are separated by 30 inches and are arranged to align, when the casing 100 is assembled, with two of the ports 406 of the control electronics section 106. In this embodiment, the placing of the valves 704 can be spaced at either 30 inches or 14 inches. As will be familiar to the skilled person, there are sets of standard 'spacings' employed to mount stores to military aircraft in accordance with an interface as specified by MIL-STD-8591H: 30 inches and 14 inches, which are used for heavy and light class stores respectively. Western military aircraft use this standard to allow the fitment of a very wide range of stores. By providing the casing with facilities for both within the hardback 114, the casing can be mounted according to either standard. Therefore, the pressure relief valve fittings and mountings for attaching to an aircraft (described in greater detail below) are interchangeable mounted at either spacing: if a 30 inch interface is required, then the valves will be separated by 14 inches, and vice versa.

On the upper face thereof, the hardback 114 comprises attachment lugs 706 which, in the illustrated embodiment are separated by 14 inches (but could be exchanged with the relief valves 704) and are arranged to allow attachment to an aircraft. Suitable lugs are MACE fittings or Bale lugs (which are used with sway braces for which the hardback has been sized and profiled), which accord with MIL-A-8591H. As will be familiar to the skilled person, MACE is an attachment fixing method for stores used exclusively by Tornado aircraft and Bale lugs are a more widely used fixing which use external sway braces for the store. In this embodiment, as the hardback 114 provides structural support to the casing 100, the control electronics section 106 and the hardback 114 are intended to be permanently attached to one another following manufacture. The attachment lugs 706 also allow attachment of an adaptor rail 708 shown in FIG. 7C.

The adaptor rail 708 is arranged to provide an interface with a standard attachment and comprises a machined alloy 'ski-shaped' rail with lug ports 710 for receiving the attachment lugs 706, cable fairing 712 and steel lug 'saddles' 714 which are bolted to the adaptor rail 708 and arranged to allow attachment to a platform arranged to carry an LAU-7 missile launcher (For further information on the LAU-7/A (series) guided missile launcher, refer to published guide NAVAIR 11-75A-54). As will be familiar to the skilled person, such attachments exist as standard on many aircraft, in particular military aircraft, and therefore such an adaptor rail 708 may be of use if the casing 100 is to be mounted on such aircraft. A quickly detachable nose part of the rail allows for cable routing from the casing to the aircraft via the LAU-7 pylon.

FIGS. 8A and B show examples of cameras 802 arranged on mountings 804, 806 which are suitable for mounting in the nosecone 102 and the sensor sections 104, 108. In this example, the cameras are high speed cameras. The cameras 802 can be programmed, focused and adjusted 'on wing' in real time by an operator from an external computer, thus ensuring the fidelity of captured images. The images are stored on HD cards which may be removed from the camera 102. One example of a suitable camera is the Phantom Miro 3 manufactured by Vision Research, Inc.

The cameras 802 therefore are associated with a memory, in this case each containing 5 MB HD memory card. In use, they are arranged to be continuously on and run a looped video recording system, capturing and segmenting only the images required as defined by the operator settings around the trigger event mark (for example, store from a minute before and to a minute after a drop). This portion of memory is segmented but recording continues to loop around the remaining memory such that multiple drops may be recorded during a single sortie if required and subject to the remaining memory left on the camera HD card (5 MB in this example, but this could be increase if required).

The mountings 804, 806 allow the cameras 802 to be rotated through a range of positions (i.e. they have Range of Movement, or R.o.M), in this example through 30°, and secured in a position by a bolt 808 mounted in a cut-out slide arc 810. The mounting 804, 806 and camera are arranged such that the lens 'nodal' point is coincident with the rotation point, which ensures that there are no odd imaging effects when swinging the camera 802 to view different target images. It will also be recalled that the sections may be mounted together at a range of angles, which provides further freedom in the pointing direction of the camera 802. The mountings 804, 806 are also shaped to follow the contours of the base of the section in which they are to be housed, allowing them to be securely fixed therein.

This particular R.O.M was selected considering the maximum requirements for image field of view in the scenario of monitoring store release. Given the use of wide angle lenses, any further rotation of a camera 804 mounted in a nosecone section 102 to the side is unnecessary as the images gathered by the sensor section 104, 108 mounted cameras 802 would produce an overlap with it, thus giving the a continual strip image. There are however no practical limits on this and the cameras 804 could be arranged to rotate by a full 360° if required.

In addition, the cameras 802 are arranged to be adjustable by 30 mm relative to the mounting 804, 806 and secured in place by a bolts 812 mounted in a cut out slide lines 814, only one of which can be seen in FIG. 8 but, as can be seen from FIG. 11 three such bolt/cut out pairs are provided to add to the stability of the platform. This allows for different lens types, and/or changes in focal length to be employed.

Once the cameras 802 are mounted within the casing 100, the access panels 304 allows camera adjustment, even when the casing is mounted on the platform including accurate pointing, focus and set up of the cameras before imaging (e.g. imaging sorties), for example by use of a laptop or other computing equipment to view through each camera 802, which may be accessed directly or by connection via an interface on the control electronics section 108.

FIG. 9 shows a cross section of an assembled casing 100 carrying exemplary equipment. The casing 100 carries three cameras 802, one in each sensor section 104, 106 and one in the nosecone section 102. In addition, a GPS antenna 902 is mounted in the nosecone 102 (it will be appreciated that the nosecone is a composite: the other sections are metal and could disrupt the GPS signal). This GPS signal is used to time stamp the images taken and alternative systems (e.g. datalink) could be used which also comprises a protective bulk head 904 (described in greater detail in relation to FIG. 12 below)

mounted between the nosecone 102 and the first sensor section 104. Internal support rings 914 are arranged at intervals along the interior of the control electronics section 106 as described above.

In the control electronics section 106, there is provide a control and interface panel 906, an event trigger control unit 908, an IRIG unit 910 and a battery housing 912.

In the example now described, the control and interface panel 906 is arranged to allow information stored on the cameras 802 to be downloaded. The control and interface panel 906 also comprises a battery power indicator, trigger alert LEDs (which provide a 'press to test' facility ensures the validity of the trigger system circuit that is temporarily fitted to the aircraft and the correct functioning of the cameras), a control interface for the IRIG unit 910, a power input used for ground power during set up, a master/slave setting facility so that, if there are two casings 100 fitted to an aircraft, one casing 100 can act as the master and one as the slave (this addresses a problem that may otherwise arise as both/all of the casings 100 may take timestamp information from their own GPS unit: only one timestamp can be used otherwise conflict will arise (even milliseconds discrepancy could produce errors).

In this embodiment, the battery housing 912 houses two UBBL10 Lithium-Ion batteries (although provision is made for 3 for additional duration if required) which are arranged to power all of the electrical components. These batteries have a nominal capacity of 33V at 6.8 Ah each, weigh a maximum of 1.44 Kg each, are certified from −32° C. to +60° C., and have a thermal trip at 70° C.+/−5° C. The batteries' chemistry is manganese (spinel) which provides superior thermal stability as it withstands temps up to 250° C. compared to 130° C. of the cobalt alternative. As can be seen from the table below, the batteries are capable of powering the electrical components for in excess of 9 hours. Therefore, these batteries have been selected given the proposed operating equipment and conditions. Other equipment/conditions may require different batteries In particular, in this embodiment, the electrical requirements of the various components are approximately as follows:

| | |
|---|---|
| Miro 3 Camera (×3) | 1.09 Amps |
| IRIG | 0.11 Amps |
| ETCU (estimated) | 0.10 Amps |
| Trigger alert LED (×4) | 0.06 Amps |
| GPS Antenna | 0.02 Amps |
| Battery Status Indicator | 0.03 Amps |
| Estimated total power consumption | 1.41 Amps |

Two Li-Ion batteries rated 6.8 Ah @ 33 volts therefore provide 13.60 A/hour, and can therefore power the equipment for approximately 9 Hrs 38 mins The assembled casing 100 carrying the equipment described has sufficient power reserves to run independently for in excess of 9 hours.

In this embodiment, the cameras 802 are provided to record video images of an event, in particular the release of stores from an aircraft carrying the casing 100. The trigger mechanism used in this embodiment comprises, as is shown in FIG. 11, 'break wires' 120, i.e. wires which are physically broken by dropping stores (although in other embodiments, they could be broken by opening clamps or other physical triggers or indeed by pressure or chemical changes). This is a simple way of ensuring that a signal occurs at a relevant time and enables the recording system to be autonomous (such that, in the event that the casing 100 is to be used on an aircraft, the aircrew will not have to trigger the camera separately to releasing the store, easing the burden on the crew).

In the embodiment illustrated in FIG. 10, the break wires 120 are attached via sacrificial junctions 122 (e.g. 'Jiffy' junctions) to junction modules 124. The break wires 120 are also attached to the store release mechanism. When a store is jettisoned, a wire 120 breaks and causes a voltage spike in the system, which is measured by the event trigger control unit 908 and noted as an event mark. This mark is time stamped and used as the event signal around which the cameras 802 are programmed (during set up) to record and segment images.

As noted above, the cameras 802 each include a memory card. They are always on and run a looped video recording system, capturing and segmenting only the images required as defined by the operator settings around the trigger event mark (for example, store a minute before and after a drop). This portion of memory is segmented but recording continues to loop around the remaining memory such that multiple drops may be recorded during a single sortie if required and subject to the remaining memory.

There are of course many other methods of triggering the cameras 802 or other sensors carried in the casing—for example, a change in pressure (such as a aircraft reaching a certain altitude, a submarine craft reaching a certain depth, or a change in atmospheric pressure indicative of a notable change in the weather or environment) could be detected. The sensors could be triggered by detection or absence of a heat source (as some intruder detectors and fire alarms), a change in the visual image (as will be familiar from intruder detectors and other areas), photovoltaic cells triggered by a flares release (particularly in the imaging of such flares), or the like.

FIG. 11 shows some further detail of a camera 802 mounted in a nosecone section 102. As noted above, the shape of the nosecone section 102 is a compromise between aerodynamic performance, structural considerations and imaging requirements. FIG. 11 also shows how a camera 802 mounted in such a nosecone section 102 could be placed to optimise the imaging conditions. FIG. 11 also illustrates the shape of the nosecone section 102, i.e. the substantially conical base portion 206 (a slight curve following the line of the ogive profile can be seen), and the triangular cross section of the wedge (i.e. the symmetrical angular truncations to the narrow ogive form)

It will be noted that the camera 802 pointing direction is offset from the longitudinal axis of the nosecone section 102 by 10°, and can be slewed on its mounting 806 by a further 30°. This means that the imaging out of one of the panels 202 is optimised although, as the entire nosecone section 102 can be rotated about its axis by 360°, the direction that this panel 202 faces can be set as required for a given operation (e.g. to observe a store drop vertically down or be released forwards, or the like). This in turn means a virtually 'hemispherical' field of view can be acquired by adjustment of the nosecone section 102 and use of wide angle lenses. It should also be recalled that, in this embodiment, the camera 902 in the nosecone section 102 is working in conjunction with the cameras 802 in the sensor sections 104, 108 and therefore the chosen range of angles may be complementary to the field of view of those cameras, e.g. to ensure that a continuous image can be stitched together from the images produced by the, in this embodiment, three cameras. The relative angle of lens to a panel is between 30 and 60°, which has the effect ensuring minimum narcissus effect.

FIG. 12 shows of two faces of the bulkhead 904 which comprises a 'grill' or baffle arranged to disrupt the airflow in the event that the glass panels 202 or any other element in the nosecone section 102 fails. The design is such that airflow is diffused: although some air will enter the remaining casing sections, this airflow will not be powerful enough to damage the components housed therein.

Specifically, in this embodiment, the bulkhead 904 comprises two mating faces—a forward face 131, and a back face 133, each of which is formed with a series of indentations which can be seen on the external faces as protruding ribs 123, which run in perpendicular directions on mating faces 131, 133. The indentations of the ribs 123 form perpendicular crossing channels between the mating faces 131, 134. The bulkhead 904 also comprises holes 125 to allow air to flow therethrough, half turn locking keys 127 arranged to cooperate with holes formed in the retaining flange 604 of the nosecone section interface ring 112, and a handle 129 on the back face 133. The bulkhead 904 can easily be removed to allow manual access to a camera or other sensor housed in the nosecone section 102 via an access panel 304 of the sensor section 104, and the bulkhead 904 can be removed by releasing the locking keys 127 and removing it with the handle 129.

In the event that the front end of the casing 100 fails, the airflow passes through the network of holes 125 in the forward face 131, which are aligned with the internal channels provided by the ribs 123 on the mating back face 133. In order to exit the bulkhead 904, the air is then made to turn at 90° to enter the channels formed by the ribs 123 on the forward face 131, which are aligned with the holes on the back face 133. The air passes down inside the ribs 123 and out again via the holes 123 perforating the back face. In this way, the air flow is baffled but not completely restricted.

In this embodiment, the size, mass and inertia of the casing when loaded with equipment are closely comparable or matched to a known store. This means that an aircraft carrying the casing 100 can be controlled and will respond in the same way as is known from flying the aircraft with the known store. In that sense, the casing 100 may be seen as a 'surrogate' version of, or to emulate, the known store by the flight control systems of aircraft. This removes the need for an extensive new flight control law programming and evaluation of the aircraft's native flight control system as would be required for a 'new' store. However, in some cases, the effect of minor differences may be modelled and used to modify existing flight control laws.

FIG. 13 shows the loaded casing, when attached to the adaptor rail 708 (which itself has a mass of around 8 Kg) has a mass of approximately 88 Kg. Length, centre of gravity and inertia is chosen to be as close as practicable to that of an AIM/9L Sidewinder missile or an ASRAAM missile, enabling where necessary, simplified flight clearances on airframes cleared for use of these stores as a minimum.

As noted above, the Sidewinder in particular is a widely used store, and its physical specifications are widely publicly available. Many military aircraft will have established flight control laws for flying with one or more Sidewinders mounted thereto.

As can be seen from FIG. 13, the saddles 714 on the adaptor rail 708 are spaced at 30.46" and 34", the standard position of the attachments as defined by published standards. In addition, the centre of mass (indicated by a dashed line) of the casing 100 is aligned with the position of the centre of mass of a Sidewinder and an ASRAAM (which are themselves aligned) when suspended from an aircraft by the standard attachment means (i.e. is spaced from the attachments along the length by the same measurement. Indeed, the centre of gravity and centre of mass is aligned lengthwise within the specified tolerances within such stores, which is generally within about ±10% but may be kept to within ±5%. In addition, the casing 100 is arranged such that, when loaded and suspended from the adaptor rail 708, its centre of mass is just 93 mm lower than that of a Sidewinder missile similarly suspended, which does not greatly effect flight characteristics while providing sufficient internal volume for the casing 100 to house the desired equipment. However, in other embodiments, these may be more closely aligned.

Depending on the equipment used, ballast may be added to, or arranged within, the casing 100 to ensure the characteristics match known stores.

Of course, the sensor/control electronic/nosecone and tail cone sections described herein could each independently be replaced with bespoke adaptations. In particular, the casing 100 could, within practical limits, be converted for use as a flight vehicle structure for the test and evaluation of a wide number of airborne sensors. The modular structure approach allows future adaptability to uses other than the specific example of high speed imaging described herein.

It will be appreciated that, provided that the interfaces remain consistent, there is (subject to aerodynamic considerations given the intended use) no limitation to the profile of any given section: each section could therefore be replaced with a bespoke section of any profile.

Although the description above refers to the use of a relatively light alloy for the majority of the sections, which was selected based on the criteria of strength/weight, manufacturability and cost, the material from which any section is dependant on its intended function. For example, if the casing 100 is to be attached to an aircraft, any aerospace type composite or metallic construction would be acceptable subject to stress analysis clearances. There may however be higher strength requirements for any section which includes hardpoint attachments in some embodiments.

Any range or device value given herein may be extended or altered without losing the effect sought, as will be apparent to the skilled person for an understanding of the teachings herein.

The invention claimed is:

1. A modular casing for sensing apparatus configured to be externally mounted on a high speed aircraft, the modular casing comprising:
   a nose section, at least one body section and one tail section, wherein said sections are detachably connected to one another so as to permit disassembly of the casing, and wherein the nose section has a tapering form with symmetrical angular truncations such that the nose section tapers in the form of a wedge with two substantially planar regions and terminates with a leading edge strip; and
   mounting means configured to allow the modular casing to be externally mounted onto the high speed aircraft, wherein the mounting means comprises a load carrying structure for providing hardpoint attachments to a host aircraft.

2. A modular casing according to claim 1 which is roughly cylindrical in shape along at least a portion of its length.

3. A modular casing according to claim 1 in which the casing sections are connected by connectors arranged to interact with two adjacent casing sections.

4. A modular casing according to claim 1 in which at least one casing section comprises a cut-out portion arranged to provide access to the interior of the casing and/or to receive an interface that is configured to allow information gathered by a sensor housed in the casing to be accessed.

5. A modular casing according to claim 1 which comprises pressure relief valves.

6. A modular casing according to claim 1 in which the sections are independently rotatable about the common axis of the casing.

7. A modular casing according to claim 1 which is configured to house one or more of each of the following: sensor, location sensor, communication device, driver equipment, memory, battery, electronic control unit, desiccator, electronic interface.

8. A modular casing according to claim 1, the casing comprising a housing for imaging equipment, wherein the housing is configured to be used in high speed airflow, wherein at least one substantially planar region comprises an aperture formed of optically transparent material.

9. A modular casing according to claim 8 in which the housing comprises an ogive form having symmetrical angular truncations.

10. A modular casing according to claim 8 in which both planar regions are provided by optically transparent materials.

11. A modular casing according to claim 8 in which the strip is capable of heat conduction.

12. A modular casing according to claim 8 in which the optically transparent material comprises glass.

13. A modular casing according to claim 8 which further comprises a base region which is substantially cylindrical in shape.

14. A modular casing according to claim 8 in which the internal angle of the wedge is approximately 40-45°.

15. A modular casing according to claim 8 wherein the housing is configured to act as a nose cone when the casing is mounted on a high speed aircraft.

16. A modular casing according to claim 1, the casing being configured to be mounted on the exterior of an aircraft, the casing being configured such that at least one of the following qualities/quantities thereof is similar to that of a known aircraft store carried by the aircraft to which the casing is intended to be mounted: length, weight, center of mass, center of gravity, inertia length, cross sectional area.

17. A modular casing for sensing apparatus configured to be mounted on a high speed vehicle, the modular casing comprising:
a nose section, at least one body section and one tail section, wherein said sections are detachably connected to one another so as to permit disassembly of the casing;
mounting means configured to allow the modular casing to be mounted onto the high speed vehicle wherein the mounting means comprises a load carrying structure for providing hardpoint attachments to a host vehicle; and
a housing for imaging equipment, wherein the housing is configured to be used in high speed airflow, the housing having a tapering form with symmetrical angular truncations such that it tapers in the form of a wedge with two substantially planar regions, wherein at least one substantially planar region comprises an aperture formed of optically transparent material, and wherein the housing comprises an ogive form having symmetrical angular truncations.

18. A modular casing for sensing apparatus configured to be mounted on a high speed vehicle, the modular casing comprising:
a nose section, at least one body section and one tail section, wherein said sections are detachably connected to one another so as to permit disassembly of the casing;
mounting means configured to allow the modular casing to be mounted onto the high speed vehicle wherein the mounting means comprises a load carrying structure for providing hardpoint attachments to a host vehicle; and
a housing for imaging equipment, wherein the housing is configured to be used in high speed airflow, the housing having a tapering form with symmetrical angular truncations such that it tapers in the form of a wedge with two substantially planar regions, wherein at least one substantially planar region comprises an aperture formed of optically transparent material, and wherein both planar regions are provided by optically transparent materials.

* * * * *